United States Patent [19]

Yasufuku et al.

[11] Patent Number: 4,652,496
[45] Date of Patent: Mar. 24, 1987

[54] MAGNETIC RECORDING MEDIUM

[75] Inventors: Yoshitaka Yasufuku; Masaji Nara; Shigeru Akutsu, all of Hino, Japan

[73] Assignee: Konishiroku Photo Industry Co., Ltd., Tokyo, Japan

[21] Appl. No.: 742,615

[22] Filed: Jun. 7, 1985

[30] Foreign Application Priority Data

Jun. 13, 1984 [JP] Japan ............................ 59-121013

[51] Int. Cl.$^4$ ............................................. G11B 5/70
[52] U.S. Cl. ........................ 428/425.9; 252/62.54;
  360/134; 360/135; 360/136; 427/128; 427/131;
  428/328; 428/329; 428/694; 428/695; 428/900
[58] Field of Search ................ 428/695, 900, 425.9,
  428/403, 328, 329, 694; 252/62.54; 427/128,
  131; 360/134–136

[56] References Cited

U.S. PATENT DOCUMENTS

| | | | |
|---|---|---|---|
| 4,058,646 | 11/1977 | Vaeth | 428/425.9 |
| 4,469,750 | 9/1984 | Fujiki | 428/695 |
| 4,469,751 | 9/1984 | Kobayashi | 428/695 |
| 4,525,424 | 6/1985 | Bradshaw | 428/329 |
| 4,546,044 | 10/1985 | Asano | 428/694 |
| 4,568,611 | 2/1986 | Amirsakis | 428/328 |

Primary Examiner—Ellis P. Robinson
Attorney, Agent, or Firm—Frishauf, Holtz, Goodman & Woodward

[57] ABSTRACT

Disclosed is a magnetic recording medium which comprises a support, a magnetic recording layer and optionally a back-coating layer, at least of said magnetic recording layer and said back-coating layer containing a urethane resin having a yield point.

The tape performances of the magnetic recording medium according to the present invention can be markedly improved by incorporating the urethane resin having a yield point.

18 Claims, 8 Drawing Figures

MAGNETIC RECORDING MEDIUM

BACKGROUND OF THE INVENTION

This invention relates to a magnetic recording medium such as magnetic tape, magnetic sheet, magnetic disc, etc.

In general, a magnetic recording medium is prepared by applying a magnetic paint containing magnetic powder, a binder resin, etc. on a support and drying the coating. In the magnetic recording medium thus prepared, the magnetic layer comes into vigorous sliding contact with a magnetic head to give rise readily to abrasion or powder drop-off, whereby lowering in reproduction output, output fluctuation, drop-out, increase of noise are liable to be caused.

For overcoming such drawbacks, countermeasures have been taken to enhance mechanical strength and durability of the magnetic layer side by provision of an overcoat layer (hereinafter sometimes referred to as OC layer) on the magnetic layer. Also, in some cases, for the purpose of improving running performance or winding appearance stability (in the case of tape), a back-coating layer (hereinafter sometimes referred to as BC layer) may be provided on the support on the side opposite to the magnetic layer.

For example, concerning BC layer, it is well known in the art to use a urethane resin as the binder resin, as disclosed in Japanese Patent Publications Nos. 2613/1965, 15004/1963 and 29769/1982. Urethane resins known in the art are synthesized from a polymeric diol, a diisocyanate, a chain elongating agent and (optionally) a cross-linking agent. As the polymeric diol, there may be included polyester diols obtained from adipic acid, butane diol, etc., polyether diols, polycarbonate diols and the like; and the diisocyanate available may be, for example, diphenylmethane diisocyanate, etc. The chain elongating agent may comprise ethylene glycol, butane diol and the like, and the cross-linking agent may be, for example, a polyol, a polyamine, etc.

However, such urethane resins in general may be excellent in flexibility, but they are lacking in hardness. Therefore, in sliding contact against a guide pin or a magnetic head, the magnetic recording medium is poor in mechanical strength and also involves problems in aspects of running performance or powder drop-off.

On the other hand, for the magnetic powder, ferromagnetic powder is generally employed, which has a large magnetic moment, and interactions will readily occur between the particles to cause particle agglomeration, whereby it is impossible to disperse particles uniformly in the binder resin. As the result, the magnetic recording medium becomes markedly inferior not only in the magnetic characteristics such as rectangular ratio, etc. but also inferior in properties such as surface characteristic, running performance, abrasion resistance, etc. whereby powder drop-off, drop-out will occur to bring about lowering in reproduction output and still characteristic.

As the magnetic powder for such a magnetic layer, $\gamma$-$Fe_2O_3$ is generally employed. The $\gamma$-$Fe_2O_3$ powder ordinarily consists of co-existing trivalent iron ($Fe^{3+}$) and divalent ion ($Fe^{2+}$), mostly of $Fe^{3+}$ with a proportion of $Fe^{2+}$ being 2 to 3 atomic %. The magnetic characteristics are considered to be better as the $Fe^{3+}$ is greater in amount, and therefore $Fe^{2+}$ is made as small as possible.

Also, in some kinds of magnetic recording medium, for example, a magnetic tape for a video recording, there is the system in which the light transmittance of the magnetic layer is made smaller (shielding force is made greater) and the difference in light transmittance from the reader tape portion is detected to control running of the tape. In this case, the shielding force is increased by addition of carbon black in the magnetic layer to suppress light transmittance to 0.05% or less. However, by addition of carbon black for the purpose of increasing the shielding force, the magnetic layer will become weaker in strength to be poor in durability.

For the purpose of removing such drawbacks, (1) Japanese Patent Publication No. 44967/1982 proposes to use a magnetic paint containing a polyvinyl butyral resin and a polyfunctional isocyanate compound as the binder components of the magnetic powder. Also, in (2) Japanese Patent Publication No. 56128/1982, it has been proposed to use as the binder resin for the magnetic layer a composition comprising a vinyl chloride-vinyl acetate-vinyl alcohol copolymer with a molecular weight distribution of 1.80 to 2.40 and a urethane polymer as the main components, to which a low molecular weight polyisocyanate is added.

However, dispersibility of the magnetic paints obtained by the above known techniques (1) and (2) cannot necessarily be said to be satisfactory. Besides, due to greater paint viscosity and low durability and abrasion resistance of the coating (magnetic layer), it is not possible to reduce clogging of the head due to powder drop-off or generation of drop-out. Generally speaking, a magnetic recording medium is required to satisfy the following requirements in recording and reproduction:

(1) Since the medium runs while being in contact with magnetic head, guiding members, etc., the magnetic layer is required to be excellent in running performance with a small coefficient of friction and also small in abrasion of the magnetic layer with excellent durability, because it comes into vigorous sliding contact with a magnetic head during reproduction; and (2) the magnetic characteristics or electromagnetic converting characteristics are influenced chiefly by the dispersed state of the magnetic powder.

For the above requirement (1), namely improvement of lubricity and abrasion resistance, various lubricants have been attempted in the prior art to be contained in the magnetic layer, and silicone oil with great lubricating effect has been practiced to be contained in the magnetic layer.

However, while silicone oil is excellent in lubricity, it is poor in compatibility with a binder resin and therefore involved the drawbacks such as formation of pinholes through ununiformization of the magnetic layer or blooming onto the surface of the magnetic layer, although it could sufficiently reduce the frictional resistance of the magnetic layer.

For removing such drawbacks, in the prior art, there have been known techniques to add into the magnetic layer an alcohol-modified organic silicone compound as disclosed in Japanese Provisional Patent Publication No. 37731/1982, a carboxyl-modified organic silicone compound as disclosed in Japanese Provisional Patent Publication No. 37732/1982, an amino-modified organic silicone compound as disclosed in Japanese Provisional Patent Publication No. 37733/1982 or an organic silicone compound as disclosed in Japanese Provisional Patent Publication No. 37734/1982. However, according to these known techniques, although lubricating effect may be improved, electromagnetic converting characteristics of the magnetic recording medium are not satisfactory.

For improvement of abrasion resistance of the magnetic layer, it has been practiced to add an abrasive material such as alumina, etc. However, because the urethane resin as the binder resin is soft as mentioned above, the durability of the magnetic layer becomes worsened unless particle sizes of the abrasive particles are made to be relatively larger. For example, good abrasive force can be exhibited if the abrasive particles are made to have particle sizes of 0.5 μm or larger, but contrariwise there is involved the drwback that the magnetic head in contact with the magnetic layer will readily be damaged.

Also, as the curing agent for curing the magnetic layer, an isocyanate has been known, but it has hitherto been recognized that the amount of this curing agent cannot be increased so much. That is, if the amount of curing agent is too much, the magnetic layer will be embrittled to form readily cracks, etc. This is particularly marked when a conventional binder resin is employed in the magnetic layer, and for this reason the amount of the curing agent is described as 10% by weight or less of the total amount of the binder resin and the curing agent (see Japanese Patent Publications Nos. 15046/1981 and 41484/1979).

For improvement of the above requirement (2), namely dispersed state of magnetic powder, various dispersing agents have been attempted in the prior art to be added in the magnetic layer.

For example, addition of a dialkylsulfosuccinic acid salt is known to act effectively as a dispersing agent to improve filling degree and orientatability of the magnetic powder and impart excellent magnetic characteristics or electromagnetic converting characteristics thereto. When such a dispersing agent is employed, the binding force between the magnetic powder and the binder resin may be lowered, or blooming of the dispersing agent may readily occur on the magnetic layer surface, whereby various phenomena such as powder drop-off, output fluctuation or tape squeaking may be caused to make durability inferior. Also, a polyalkylene oxide alkylphosphate can also act effectively as the dispersing agent similarly as the above dispersing agent, but also involves the same drawbacks.

For this reason, it has been thougt of to employ a dialkylsulfosuccinic acid salt and a fatty acid-modified silicone compound in combination, as disclosed in Japanese Provisional Patent Publication Nos. 152535/1982 and 152537/1982. However, even in these known techniques, it can yet hardly be said that running performance, durability and electromagnetic converting characteristics are satisfactory.

On the other hand, the solvent for the magnetic paint to be used for formation of a magnetic layer will influence the dispersibility of the magnetic powder, and hence the recording and reproduction characteristics, and yet itself required to be stable and have a long pot life. However, such solvents have hitherto not necessarily been studied thoroughly.

SUMMARY OF THE INVENTION

An object of the present invention is to provide a magnetic recording medium having adequate flexibility as well as sufficient mechanical strength and durability, which is excellent in running performance and little in powder drop-off.

Another object of the present invention is to provide a magnetic recording medium having good reproduction output characteristic and electromagnetic converting characteristic, which is free from damage of a sliding partner member such as a magnetic head while retaining abrasion resistance of the magnetic layer.

More specifically, the magnetic recording medium of the present invention comprises a support, a magnetic recording layer and optionally a back-coating layer, at least of said magnetic recording layer and back-coating layer containing a urethane resin having a yield point.

BRIEF DESCRIPTION OF THE DRAWINGS

The accompanying drawings are set forth for illustration of Examples of the present invention, in which.

DESCRIPTION OF THE PREFERRED EMBODIMENTS

Figure 1:
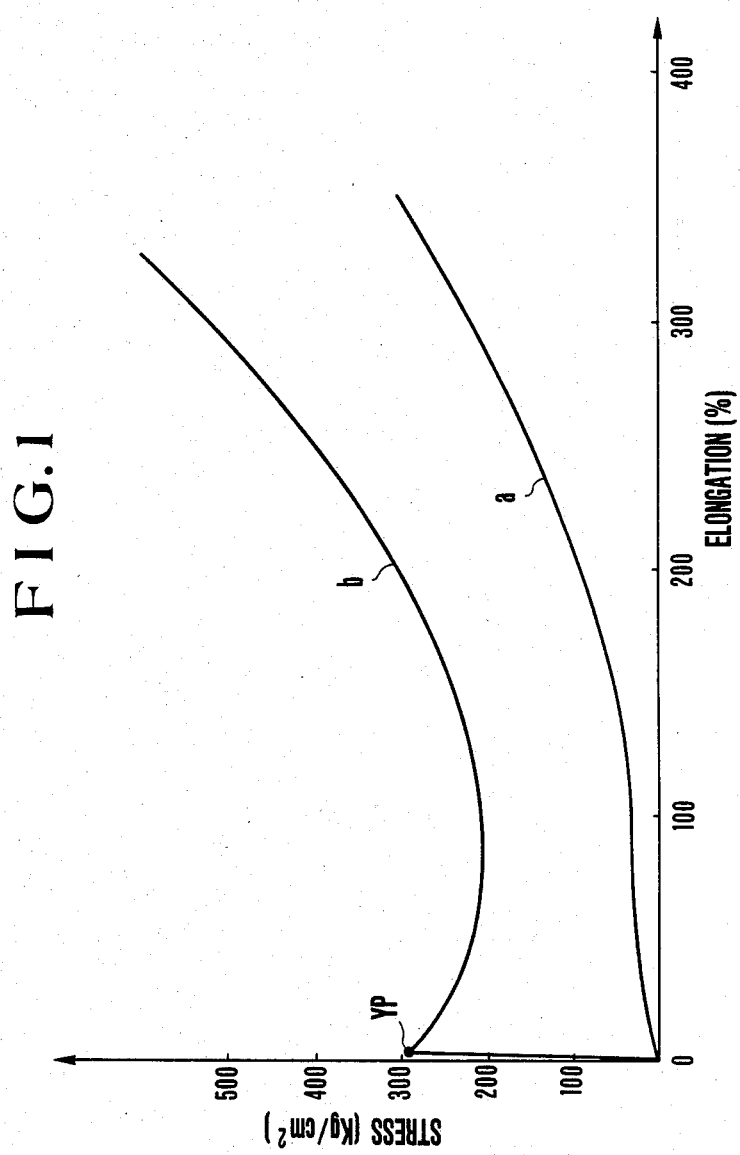
FIG. 1 is a graph showing the relationships between the stress and elongation of urethane resins.

According to the present invention, a urethane resin having a yield point is employed as the binder resin component of the magnetic layer or back-coating layer. This urethane resin is a urethane resin having a yield point YP as illustrated by the curve b, as contrasted to the curve a of the urethane resin of the prior art, as shown in FIG. 1. Until reaching the yield point YP, the elongation is very small with application of a stress, and therefore adequate hardness is imparted to the urethane resin, and, after reaching the yield point, the resin exhibits the property to be elongated without breaking by application of stress. Accordingly, the mechanical strength of the magnetic recording medium can be improved with reduction in damage such as abrasion, etc. during sliding contact and powder drop-off to great extent, and running performance can also markedly be improved. Particularly, a magnetic tape for VTR is free from edge flex, whereby control tracks at the edges and in the vicinity thereof can be maintained to exhibit excellently their functions. The above-mentioned yield point YP is important for the performance of the urethane resin of the present invention, and the yield point should desirably exist at the stress range of from 50 to 600 kg/cm², preferably from 100 to 560 kg/cm² (about 290 kg/cm² in the example shown in FIG. 1). If the yield point exists at the stress range lower than 50 kg/cm², the resin tends to be soft, while the resin tends to become rigid and brittle at the stress range higher than 600 kg/cm².

The urethane resin to be used in the present invention should preferably have cyclilc hydrocarbon residues in the molecule in order to exhibit excellent performance as mentioned above. Such cyclic hydrocarbon residues may preferably saturatd cyclic hyrocarbon residues, including divalent or monovalent cyclopentyl group, cyclohexyl group, etc., or derivatives thereof (e.g. derivatives substituted with alkyls such as methyl or derivatives substituted with halogens such as chlorine atom). These saturated cyclic hydrocarbon residues are desirable with respect to imparting adequate hardness to the urethane resin as well as availability of the starting material. The cyclic hydrocarbon residue may be bonded preferably at the site in the main chain of the urethane resin molecule, but it may also be bonded to the side chain. Also, by varying the content of the cyclic hydrocarbon residues in the urethane resin, a urethane resin having a desired glass transition point (Tg) can be obtained, and Tg may be $-30°$ C. to $100°$ C., preferably $0°$ C. to $90°$ C. If Tg is lower than $-30°$ C., the resin is too soft and can give no satisfactory film strength, while with a Tg over $100°$ C., the film tends to be brittle.

The urethane resin to be used in the present invention can be synthesied by the reaction between a polyol and a polyisocyanate. For incorporation of the above cyclic hydrocarbon residues in this reaction, the following methods (1) to (4) may be employed:

(1) the method in which a polyhydric alcohol having previously cyclic hydrocarbon residues is used as the polyhydric alcohol of the starting material for a polyol (e.g. polymeric diol);

(2) the method in which a dicarboxylic acid having previously cyclic hydrocarbon residues as is used the organic dibasic acid (dicarboxylic acid) of the starting material for the above polyol;

(3) the method in which the polyhydric alcohol and the dicarboxylic acid in the above (1) and (2) are used as the starting materials for the polyol;

(4) the method in which a polyhydric alcohol having previously cyclic hydrocarbon residues is used as the chain elongating agent either in combination with any of the above (1) to (3) or alone.

For example, as the synthetic method for obtaining the above urethane resin, there may be employed the method in which a polyester polyol obtained from 1,4-dihydroxymethylcyclohexane:

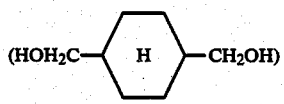

and adipic acid (HOOC-(CH$_2$)$_4$-COOH) is urethanized with methylene-bis-phenylisocyanate:

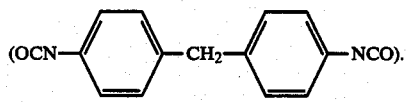

In this method, the chain elongating agent may be 1,4-dihydroxymethylcyclohexanone as mentioned above or other diols (e.g. butane-1,4-diol).

As the above polyhydric alcohol which may have previously cyclic hydrocarbon residues, those having cyclohexyl groups in the molecular chains of ethylene glycol structure as described above may be available. Other than such structures, it is also possible to use glycols such as propylene glycol, butylene glycol, diethylene glycol and the like; polyhydric alcohols such as trimethylolpropane, hexanonetriol, glycerine, trimethylolethane, pentaerythritol and the like or glycols thereof; or those having cyclic hydrocarbon residues during preparation thereof. Also, available dibasic acids may include phthalic acid, dimerized linolenic acid, maleic acid, or those having cyclic hydrocarbon residues in these molecules. In place of the above polyols, it is also possible to use lactone type polyester polyols synthesized from lactams such as s-caprolactam, α-methyl-1-caprolactam, s-methyl-s-caprolactam, γ-butyrolactam and the like or polyether polyols synthesized from ethylene oxide, propylene oxide, butylene oxide and the like.

These polyols may be allowed to react with isocyanate compounds such as toluylene diisocyanate, hexamethylene diisocyanate, methylene diisocyanate, metaxylylene diisocyanate and the like, whereby urethanized polyester polyurethanes, polyether polyurethanes may be synthesized. These urethane resins according to the present invention can be usually produced primarily by the reaction between polyisocyanates and polyols, and they can be either in the form of urethane resins or urethane prepolymers containing free isocyanate groups and/or hydroxyl groups, or in the form of those containing none of these reactive terminal groups (e.g. the form of urethane elastomers).

The chain elongating agent available may also be the polyhydric alcohol as exemplified above (either having cyclic hydrocarbon residues in the molecules or not).

As the binder resin, a phenoxy resin and/or a vinyl chloride type copolymer can also be incorporated together with the above urethane resin to improve dispersibility of the magnetic powder and increase its mechanical strength when applied for a magnetic layer. However, when only a phenoxy resin and/or a vinyl chloride type resin is employed, the layer will become too rigid, which can be prevented by incorporation of a polyurethane to improve adhesion with a support or a subbing layer.

In this case, since the above urethane resin contributes to improvement of strength, the amounts of the above vinyl chloride type copolymer and/or phenoxy resin can be made smaller than those known in the prior art. Accordingly, embrittlement of the magnetic layer, crack generation, etc. caused by greater amount of a vinyl chloride type copolymer and/or a phenoxy resin can be avoided.

An available phenoxy resin is a polymer obtained by polymerization of bisphenol A and epichlorohydrin, represented by the formula shown below:

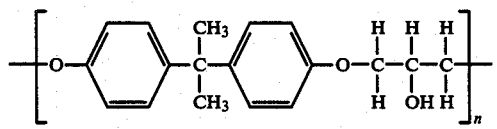

(wherein n=82−13)

Examples of the above polymer are PKHC, PKHH and PKHT produced by Union Carbide Co.

On the other hand, an available vinyl type copolymer as mentioned above may be represented by the formula:

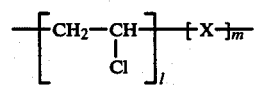

In this case, the molar ratio derived from l and m in $+CH_2-CH+_l$ unit and $+X+_m$ unit may be 95 to 50 mole % for the former unit and 5 to 50 mole % for the latter unit. X represents monomeric residues copolymerizable with vinyl chloride, representing at least one selected from the group consisting of vinyl acetate, vinyl alcohol, maleic anhydride, etc. The polymerization degree represented as (l+m) may preferably be 100 to 600. With a polymerization degree less than 100, the magnetic layer, etc. tend to be tacky, while a polymerization degree over 600 will result in poor dispersibility. The above vinyl chloride type copolymer may be partially hydrolyzed. As the vinyl chloride type copolymer, there may be preferably employed copolymers containing vinyl chloride-vinyl acetate (hereinafter referred to as "vinyl chloride-vinyl acetate type copolymer"). Examples of vinyl chloride-vinyl acetate type copolymer may include vinyl chloride-vinyl acetate-vinyl alcohol copolymers and vinyl chloride-vinyl acetate-maleic anhydride copolymers. Among vinyl chloride-vinyl acetate type copolymers, partially hydrolyzed copolymers are preferred. Typical examples of the above vinyl chloride-vinyl acetate type copolymers are "VAGH", "VYHH" and "VMCH" produced by Union Carbide Co., "Ethlec A", "Ethlec A-5", "Ethlec C" and "Ethlec M" produced by Sekisui Kagaku K.K., "Denkavinyl 1000G" and "Denkavinyl 1000W" produced by Denki Kagaku Kogyo K.K. and others.

Other than those as mentioned above, cellulose type resins may also be employed as the binder resin, which may include cellulose ethers, cellulose inorganic acid esters, cellulose organic acid esters, etc. As the cellulose ether, methyl cellulose, ethyl cellulose and the like may be employed. As the cellulose inorganic acid ester, nitrocellulose, sulfate cellulose, phosphate cellulose and the like may be available. On the other hand, available cellulose organic acid esters may be acetyl cellulose, propionyl cellulose, butyryl cellulose and the like. Among these cellulose type resins, nitrocellulose is preferred.

As for the binder composition as a whole, the ratio of the above urethane resin to other resins (the total amount of phenoxy rexin and vinyl chloride type copolymer, etc.) has been confirmed to be desirably 30/70 to 80/20 in terms of weight ratio, more preferably 35/65 to 75/25. If the urethane resin is greater in amount outside of this range, its dispersibility will be worsened, while an excessive amount of other resins will result in bad surface characteristic. Particularly, at a level over 60% by weight, the overall physical properties of coating will become unfavorable.

As the binder resin in the layer constituting the magnetic recording medium of the present invention, in addition to those as mentioned above, it is also possible to use a thermoplastic resin, a thermosetting resin, a reactive resin, or an electron beam curable resin.

As the thermoplastic resin, there may be employed those having a softening temperature not higher than 150° C., an average molecular weight of 10,000 to 200,000 and a polymerization degree of about 200 to 2,000, as exemplified by acrylate-acrylonitrile copolymers, acrylate-vinylidene chloride copolymers, acrylate-styrene copolymers, etc.

As the thermosetting resin or the reactive resin, there may be employed those having a molecular weight of not more than 200,000 under the state of a coating liquid, but being increased infinitely in molecular weight through condensation, addition, etc. after coating and drying. Among these resins, it is preferred to use one which will not be softened or melted until thermal decomposition of the resin. More specifically, there may be included phenol resins, epoxy resins, urea resins, melamine resins and alkyd resins. As the electron beam curable resins, there may be included, for example, unsaturated prepolymers such as maleic anhydride type, urethane-acrylic type and polyester-acrylic type resins.

The magnetic recording medium according to the present invention may comprise a urethane resin having a yield point and a mercapto-modified organic silicone compound represented by the following formula contained in a certain layer on a support:

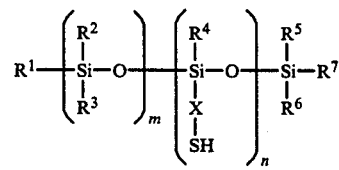

wherein $R^1$, $R^2$, $R^3$, $R^4$, $R^5$, $R^6$ and $R^7$ represent hydrocarbon residues which are identical or different, X represents a hydrocarbon residue having 1 to 30 carbon atoms, m is $0 \leq m < 1000$, n is $1 \leq n < 300$ and m+n is $m+n \leq 1000$.

In the present invention, when the above mercapto-modified organic silicone resin is incorporated together with the above urethane resin in the layer, compatibility with the binder resin is also improved to give rise to no exudation of the resin on the magnetic layer surface or generation of pinholes, whereby not only lubricity and abrasion resistance of the magnetic layer, but also electromagnetic converting characteristics can sufficiently be improved. Thus, the organic silicone compound, since having hydrocarbon residues in the main chain excellent in affinity for the binder resin, is well compatible with the binder resin to be free from exudation on the layer surface or generation of pinholes. The hydrocarbon residues having mercapto groups have lubricity to exhibit also lubricating effect also through the hydrocarbon residues having mercapto groups along with the main chain comprising organic silicone compounds excellent in lubricity, and therefore lubricity and abrasion resistance can further be improved. In addition, the paint employing the above mercapto-modified organic silicone compound can also be improved in durability and abrasion resistance of the layer without impairment of dispersibility of magnetic powder, etc.

The mercapto-modified organic silicone compound may preferably be incorporated in the magnetic layer in an amount of 0.0005 to 0.1 part by weight (further preferably 0.001 to 0.05 part by weight) per 100 parts by weight of the magnetic powder. If the amount is too small, little effect can be obtained, while an excessive amount will tend to cause blooming.

Alternatively, in the magnetic recording medium of the present invention, in addition to the urethane resin having a yield point, a urethane resin having no yield point may be contained in a certain layer on the support. The urethane resin having no yield point has a flexible property which can continuously be elongated by a stress, as illustrated by the curve a in FIG. 1, which contributes to imparting adequate flexibility and binding force to the layer.

Both of the urethane resins as mentioned above should preferably be contained in the layer at a formulation ratio adequate to exhibit excellently the effect of their combined use. More specifically, the formulation ratio of the urethane resin having a yield point to the urethane resin having no yield point may preferably be 9:1 to 1:9 in terms of weight ratio. If the former resin is less than this range, the hardness of the layer will become insufficient due to the softness of the urethane resin of the prior art, while an excessive amount of the former urethane resin will pose a problem in compatibility between the two different kinds of urethane resins.

The urethane resin having no yield point can be synthesized by use of starting materials having no cyclic hydrocarbon residue as described above according to the methods (1) to (4) for preparation of the urethane resin having a yield point.

The magnetic recording medium according to the present invention may also be one containing a urethane resin having a yield point together with a curing agent of an aromatic isocyanate and/or an aliphatic isocyanate in a layer on the support.

According to the above constitution, since at least one of an aromatic isocyanate and an aliphatic isocyanate is incorporated in the layer, the recording medium is high in durability and abrasion resistance, excellent in surface characteristic and running performance, and powder drop-off and drop-out can sufficiently be prevented, but it is preferred to incorporate both isocyanates. That is, an aromatic isocyanate and an aliphatic isocyanate (which may be a cyclic aliphatic isocyanate) are not only well compatible with each other, but also have the property to react with a paint containing binder components, thereby hardening adequately the paint. The reaction of the aromatic isocyanate in the above paint is rapid, while that of the aliphatic isocyanate is slow, and therefore addition of both isocyanates at a suitable formulation ratio to the above paint will result in formation of a layer having an adequate hardness and good surface characteristic without tackiness. For example, running stability of said medium as well as performance of recording and reproduction will be improved. Also, if only an aromatic isocyanate is added, hardening by itself is too rapid to effect uniform hardening, and yet the solvent used in synthesis thereof is also mixed into the paint, whereby the solvent to be added into the paint is restricted in kind due to the presence of such a solvent. However, by use of an aliphatic isocyanate in combination with an aromatic isocyanate, the amount of the aromatic isocyanate can be relatively reduced to alleviate the above problem, and hardening can be effected sufficiently and uniformly by the aliphatic isocyanate.

Besides, the urethane resin having a yield point as described above, having cyclic hydrocarbon residues in molecules, is more regid than conventional urethane resins, and for this reason tends to be weak in molecular movements and slow in hardening. However, by use of the both isocyanates as mentioned above, the urethane resin can be hardened sufficiently and at an adequate speed.

The aromatic isocyanate to be used in the present invention may include, for example, toluylene diisocyanate (TDI), 4,4'-diphenylmethane diisocyanate (MDI), xylylene diisocyanate (XDI), metaxylylene diisocyanate (MXDI) and adducts of these isocyanates with active hydrogen compounds, having suitably a molecular weight of 100 to 3,000. More specifically, there may be included Sumidule T80, Sumidule 44S, Sumidule PF and Sumidule L, Desmodule T65, Desmodule 15, Desmodule R, Desmodule RF, Desmodule IL and Desmodule SL, produced by Sumitomo-Bayer Urethane K.K.; Takenate 300 S and Takenate 500, produced by Takeda Chemical Industries K.K.; "NDI" and "TODI", produced by Mitsui Nisso Urethane K.K.; Desmodule T100, Millionate MR, Millionate MT, Coronate L, produced by Nippon Polyurethane K.K.; and PAPI-135, TDI65, TDI80, TDI100, Isonate 125 M and Isonate 143 L, produced by Kasei Upjon K.K.

On the other hand, aliphatic isocyanates may include hexamethylene diisocyanate (HMDI), lysine isocyanate, trimethylhexamethylene diisocyanate (TMDI) and adducts of these isocyanates with active hydrogen compounds. Among these aliphatic isocyanates and adducts of these isocyanates with active hydrogen compounds, preferred are those having molecular weights within the range of from 100 to 3,000. Among aliphatic isocyanates, non-cyclic isocyanates and adducts of these compounds with active hydrogen compounds are preferred. More specifically, there may be included, for example, Sumidule N, Desmodule Z4273, produced by Sumitomo Bayer Urethane K.K.; Duranate 50 M, Duranate 24A-100 and Duranate 24A-90CX, produced by Asahi Kasei K.K.; Coronate HL produced by Nippon Polyurethane K.K.; and TMDI produced by Huls K.K.

Of the aliphatic isocyanates, alicyclic isocyanates may be exemplified by methylcyclohexane-2,4-diisocyanate:

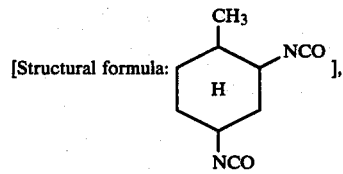

4,4'-methylenebis(cyclohexylisocyanate)

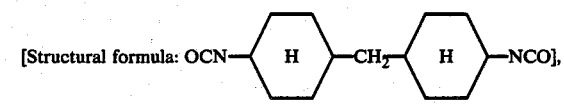

isophorone diisocyanate and adducts thereof with active hydrogen compounds. More specifically, there may be included "IPDI", IPDI-T1890, IPDI-H2921 and IPDI-B1065, produced by Huls Chemical K.K.

The amount of isocyanates (both aromatic isocyanate and aliphatic isocyanate are called comprehensively as isocyanates) added may be 1 to 100% by weight based on the binder resin. At a level lower than 1% by weight, the magnetic layer can insufficiently be hardened, while a level over 100% by weight will give a magnetic layer which may be hardened but is "tacky". For obtaining further preferably magnetic layer, the amount of the isocyanates added may preferably be 5 to 40% by weight based on the binder resin.

Figure 2:
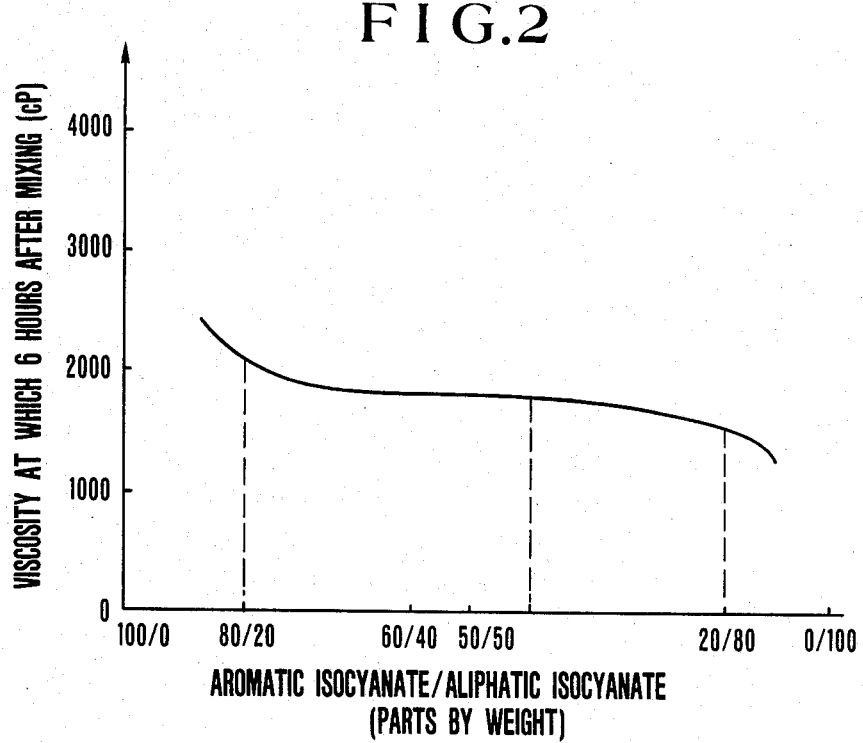
FIG. 2 is a graph showing the change in paint viscosity with the formulated amounts of both isocyanates.

The ratio of the aromatic isocyanate in the isocyanates [weight of the aromatic isocyanate/(weight of the aromatic isocyanate+weight of the aliphatic isocyanate)] should desirably be 20 to 80%. That is, as shown in FIG. 2, if the aromatic isocyanate is less than 20%, the hardening reaction may sometimes be too slow, while the hardening reaction may sometimes be too rapid at a level over 80%. In either case, the surface condition of the magnetic layer may be unfavorable (namely, "tacky" or accompanied with coarsened surface), whereby, for example, RF output, etc. of the magnetic recording medium may sometimes be lowered.

When the above curing agent is to be used in combination with a vinyl chloride type copolymer or a phenoxy resin, its amount may preferably be 15% by weight or more, more preferably 20 to 40%, based on the total amount of the binder resin and the curing agent. By making the amount of the isocyanates as the curing agent 15% by weight or more, the layer can be cured sufficiently, and the curing agent not participating in the reaction has the effect of plasticizing action on the binder resin, thus contributing to improvement of surface characteristic by the calendering treatment. As already described, embrittlement of the layer by increase of the amount of the curing agent may be considered to be related also to the rigid resin which is the binder resin component other than the urethane resin. That is to say, a rigid resin such as vinyl chloride type copolymer (e.g. vinyl chloride-vinyl acetate copolymer) or a phenoxy resin will become very hard as the amount of the curing agent is increased to promote embrittlement of the layer. Whereas, according to the present invention, since the above urethane resin having a yield point contributes to improvement of the strength, the amounts of a vinyl chloride type copolymer and/or a phenoxy resin can be reduced to lower levels than those known in the art. Accordingly, embrittlement of the magnetic layer or generation of cracks due to greater amounts of a vinyl chloride type copolymer and/or a phenoxy resin can be avoided, and the amount of the curing agent corresponding thereto can be increased as in the present invention.

Figure 3:
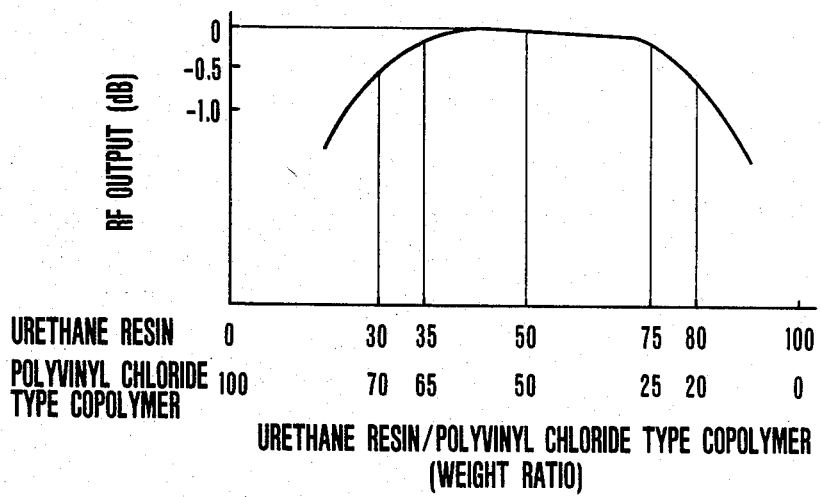
FIG. 3 is a graph showing the output change with the formulation ratio of a urethane resin to a vinyl chloride copolymer.

For this purpose, the formulation ratio of the above urethane resin having a yield point to a vinyl chloride type copolymer and/or a phenoxy resin may preferably be 30:70 to 80:20, more preferably 35:65 to 75 to 25, in terms of weight ratio. As shown in FIG. 3, if the urethane resin is less than this range, the magnetic layer will be embrittled, while an excessive amount of the urethane resin will result in shortage of the strength of the magnetic resin. In either case, RF output of the medium (in FIG. 3, relative output based on that of Example 9 as hereinafter described as 0 dB) will readily be lowered. In the magnetic recording medium of the present invention, carbon black may further be added in the layer containing above urethane resin. The carbon black should desirably have electroconductivity, but it is also possible to add one having light-shielding property. As such electroconductive carbon black, there may be employed, for example, Conductex 975 (specific surface area 250 m²/g, particle size 24 mμ), Conductex 900 (specific surface area 125 m²/g, particle size 27 mμ), produced by Columbia Carbon Co.; Cabot Vulcan XC-72 (specific surface area 254 m²/g, particle size 30 mμ), Laven 1040, 420, produced by Cabot Co.; and 44, produced by Mitsubishi Kasei K.K. As the carbon for light-shielding, there may be employed, for example, Laven 2000 specific surface area 190 m²/g, particle size 18 mμ), 2100, 1170, 1000; #100, #75, #40, #35, #30, etc. produced by Mitsubishi Kasei K.K. The carbon black should preferably have particle sizes of 20 to 30 mμ, more preferably 21 to 29 mμ, and should desirably have an oil absorption amount of 90 ml (DBP)/100 g or more for taking readily a structure constitution and exhibiting higher electroconductivity.

Figure 4:
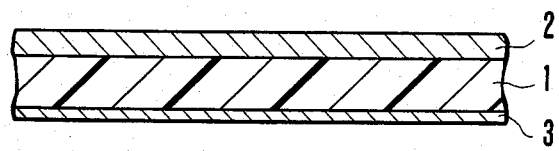
FIG. 4 is a partial enlarged sectional view of a magnetic tape.

The layer containing the urethane resin having cyclic hydrocarbon residues as described above may be, for example, a BC layer 3 provided on the surface opposite to the magnetic layer 2 of the support 1, as shown in Fig. 4. In this case, as the non-magnetic powder contained in the BC layer 3, there may be included those comprising carbon black, silicon carbide, titanium oxide, aluminum oxide, chromium oxide, calcium carbide, zinc oxide, $\alpha$-$Fe_2O_3$, talc, kaolin, calcium sulfate, boron nitride, zinc fluoride, molybdenum dioxide, calcium carbonate, etc., preferably carbon black (especially electroconductive carbon black) and/or titanium oxide. By incorporation of these non-magnetic powder in BC layer, the surface of the BC layer can be adequately roughened (matted) to improve the surface characteristic, and, in the case of carbon black, electroconductivity can be imparted to the BC layer to obtain charging prevention effect. When carbon black is used in combination with other non-magnetic powder, both effects of improved surface characteristic (stabilization of running performance) and improvement of electroconductivity can advantageously be obtained. The surface roughness of the BC layer should preferably such that the average roughness or height (Ra) of the center line of the surface unevenness may be 0.005 to 0.1 μm and the maximum roughness (Rmax) may be 0.05 to 0.40 μm. As for Ra, it can be seen that Ra should desirably be not greater than 0.030 μm (Ra≦0.030 μm) in order to obtain good chroma-S/N. If the value of Ra or Rmax is too small, running performance and winding appearance when winding up a tape become insufficient, while too large values will result in transfer from BC layer to magnetic layer (during tape winding) to cause further roughening of the surface. Also, a lubricant may be added to the BC layer 3, and such lubricants may include silicone oil, graphite, molybdenum disulfide, tungsten disulfide, fatty acid esters comprising monobasic fatty acids having 12 to 20 carbon atoms (e.g. stearic acid) and monohydric alcohols having 13 to 26 carbon atoms.

As the aforesaid non-magnetic powder, organic powder such as benzoguanamine type resins, melamine type resins, phthalocyanine type pigment, etc. may also be added.

The filler (including the non-magnetic powder) in the BC layer 3 may have an average particle size of 0.5 μm or less, preferably 0.2 μm or less, in order to obtain the surface roughness as mentioned above. On the other hand, the film thickness of the BC layer 3 after coating and drying should desirably be 0.1 to 3.0 μm, preferably 1 μm or less. The amount of the non-magnetic powder in the BC layer added may be generally 10 to 600 mg/m², preferably 20 to 500 mg/m². The magnetic powder, particularly ferromagnetic powder, to be used in the magnetic layer 2 as shown in FIG. 2 may include various ferromagnetic powders, for example, iron oxide magnetic powder such as Y-$Fe_2O_3$, Co-containing-$\gamma$-$Fe_2O_3$, $Fe_3O_4$, Co-containing-$Fe_3O_4$, and the like; metal magnetic powders consisting mainly of Fe, Ni and Co such as of Fe, Ni, Co, Fe-Ni-Co alloys, Fe-Mn-Zn alloys, Fe-Ni-Zn alloyw, Fe-Co-Ni-Cr alloys, Fe-Co-Ni-P alloys, Co-Ni alloys and the like.

Figure 5:
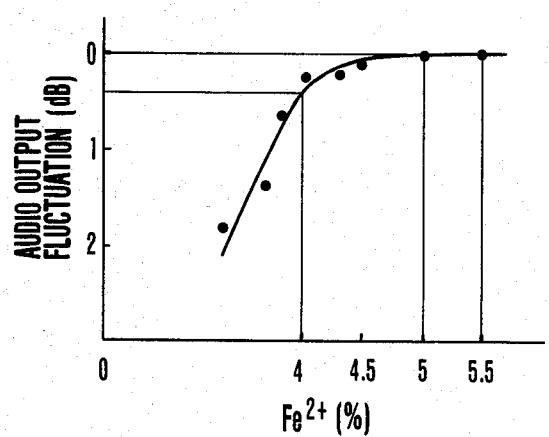
FIG. 5 and FIG. 6 are graphs showing characteristic changes with the content of $Fe^{2+}$ in magnetic powder.
Figure 6:
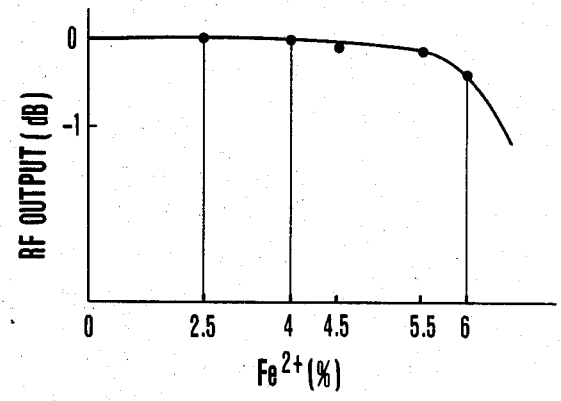

Among them, it is preferred to use magnetic particles containing 4 to 6 atomic % of divalent iron ($Fe^{2+}$), particularly containing 4.5 to 5.5 atomic %. By use of magnetic particles containing 4 to 6% of divalent iron ($Fe^{2+}$), the shielding force with magnetic powder (namely light-shielding property) can be increased, whereby the amount of the light-shielding material such as carbon black as already described can be reduced. Accordingly, while the shielding force of the magnetic layer can be made sufficient, its durability can also be improved. As the result, the respective characteristics of the audio output fluctuation and RF output can be markedly improved, as shown in FIG. 5 wherein values of audio output fluctuation after 100 passes when 5% of $Fe^{2+}$ as 0 dB are shown and FIG. 6 wherein values of RF output when 2.5% of $Fe_{2+}$ as 0 dB (first reproduction) are shown. Moreover, within the above range of the content, the inherent magnetic characteristic by trivalent iron ($Fe^{3+}$) can excellently be exhibited.

If the content of $Fe^{2+}$ is less than 4 atomic %, as shown in FIG. 5 (provided that carbon black is contained in the magnetic layer so that light transmittance may be 0.05%), the problem as already described above (lowering in strength and durability by addition of carbon black) cannot be cancelled to give greater audio output fluctuation, while an amount over 6 atomic % will result in deterioration in magnetic characteristics (coercive force, flux density, etc.) to lower RF output, etc. The magnetic powder, particularly ferromagnetic powder, to be used in the magnetic layer 2 may include iron oxide magnetic powders such as of $\gamma$-$Fe_2O_3$, Co-containing-$\gamma$-$Fe_2O_3$ and the like.

In such magnetic powders, $Fe^{2+}$ is contained in an amount of 4 to 6 atomic % based on the present invention, and this can be accomplished by controlling the ratio of the amounts of starting materials in the conventional method for preparation of magnetic powder.

Further, the magnetic powder in the above magnetic layer should preferably have a surface area of 30 $m^2/g$ or higher in terms of BET value. By making the surface area of the magnetic powder in the magnetic layer 30 $m^2/g$ or higher, the reproduction output and S/N ratio can be markedly improved. If the specific surface area of the magnetic powder is made greater than necessary, dispersion badness may be rather caused and therefore the upper limit should desirably be 100 $m^2/g$.

In the above description, the "specific surface area" refers to the surface area per unit weight, which is a physical amount entirely different from the average particle size. For example, of the particles with the same average particle size, there exist those having greater specific surface area and those having smaller surface area. For measurement of the specific surface area, for example, magnetic powder is degassed by heat treatment at around 250° C. for 30 to 60 minutes to remove impurities adsorbed on said powder, followed by introduction into a measuring device, wherein the initial pressure of nitrogen is set at 0.5 kg/$m^2$ and adsorption measurement is conducted by using nitrogen at a temperature of liquid nitrogen ($-195°$ C.) [the measurement method generally called as the BET method; see in detail J. Am. Chem. Soc., 60, 309 (1938)]. As the device for measuring the specific surface area (BET value), it is possible to use "Powder particle measuring device (Cantorsorb)", co-produced by Yuasa Denchi K.K. and Yuasa Ionics K.K. General description about specific surface area and its measuring method is given in detail in "Measurement of powder" (written by J. M. Dallavalle and Clydeorr Jr., translated by Benda et al, published by Sangyo Tosho K.K.) and also in "Handbook of Chemistry" (Application Volume, edited by Chemical Society of Japan, published on Apr. 30, 1966, by Maruzen K.K.) [the specific surface area is referred to merely as surface area ($m^2/g$) in the above "Handbook of Chemistry", but this is the same as the specific surface area as mentioned in the present specification].

When magnetic particles having a specific surface area in terms of BET value of 30 $m^2/g$ or higher are employed, it is preferred to employ the above urethane resin having a yield point in combination with at least one of a vinyl chloride type copolymer and a phenoxy resin.

For this purpose, the formulation ratio of the above urethane resin having a yield point to a vinyl chloride type copolymer and/or a phenoxy resin should desirably 30:70 to 80:20, further preferably 35:65 to 75:25, in terms of weight ratio.

Further, in the present invention, it is preferred that an average surface roughness (Ra-mag) of the magnetic recording layer which is used the above urethane resin having a yield point as a binder resin may be 0.020 $\mu$m or less. By making the Ra-mag 0.020 $\mu$m or less, chroma-S/N becomes large and thus the chroma-S/N changes in inverse proportion to the value of the Ra-mag. Accordingly, the Ra-mag should preferably be 0.020 $\mu$m or less, more preferably 0.016 $\mu$m or less, and most preferable 0.014 $\mu$m whereby preferable for a Hi-fi, a high grade, a high resolving power and a master tape which are required to have high quality. The lower limit of the Ra-mag may desirably be 0.005 $\mu$m since running characteristics will be apt to become unstable, e.g. image fluctuation may be caused when it is too little.

In order to realize the above range of the Ra-mag, 0.5 to 6% by weight of a dispersant should desirably be used when the magnetic recording layer is formed. If the amount of the dispersant is too small which is out of the range as mentioned above, it is difficult to make the surface roughness of the magnetic recording layer in the predetermined small range of Ra-mag$\leqq$0.020 $\mu$m becasue of bad dispersion, while the dispersant is too much, bleed out of the dispersant from the magnetic recording layer will likely be caused.

Moreover, since the urethane resin to be used in the present invention has smaller tackiness as compared with the conventional urethane resin, running thereof becomes stable when it is used, for example, for a video tape, and jitter value thereof could be controlled in a small value than the conventional one. Therefore, running characteristics thereof is stable even when the Ra-mag of the magnetic recording layer is 0.014 $\mu$m or less, and thus there is another advantage that high output could be retained.

Also, the magnetic recording medium as shown in FIG. 4 may be one having a subbing layer (not shown) between the magnetic layer 2 and the support 1, or no such subbing layer may be provided (hereinafter the same). The binder resin in the magnetic layer 2 may be any one known in the art. In the magnetic layer, there may also be added the lubricants as described above, as well as known dispersants (e.g. powdery lecithin), abrasives (e.g. molten alumina), antistatic agents (e.g. graphite), etc.

Abrasives to be employed may preferably have an average particle size of 0.4 $\mu$m or less, more preferably to 0.4 $\mu$m. By making the average particle size of abrasive particles 0.4 $\mu$m or less, the magnetic head, etc., which the sliding partner material of the magnetic layer, will not be damaged because of small particle sizes. The abrasive particles can be made to have such a small average particle size, because there is involved no problem by use of abrasive particles with smaller average particle size, since the urethane resin is hard enough to be enhanced in strength and abrasion resistance of the magnetic layer as described above. The abrasive material available here may include various materials as hereinafter described, but particularly preferably α-$Al_2O_3$. The α-$Al_2O_3$ has a high crystallinity due to its crystalline structure, and therefore can exhibit sufficient abrasive force even when it is made to have smaller particle sizes.

As the abrasive material which can be added, there may be employed α-$Al_2O_3$ (corrundum), artificial corrundum, molten alumina, silicon carbide, chromium oxide, diamond, artificial diamond, garnet, emery (main components: corrundum and magnetite), etc. These abrasive materials may be added in an amount within the range of from 1 to 20 parts by weight per 100 parts by weight of the magnetic powder.

As the material for the support 1, there may be employed plastics such as polyethyleneterephthalate, polypropylene, etc., metals such as Al, Zn, etc., glasses, ceramics such as BN, silicon carbide, porcelain, earthenware, etc.

During formation of the above BC layer (or OC layer) by coating, it is desirable to add a predetermined amount of a polyfunctional isocyanate as the cross-linking agent in the respective paints. Such cross-linking agents may include, in addition to the polyfunctional polyisocyanate as already described, triphenylmethane-triisocyanate, tris-(p-isocyanatephenyl)thiophosphite, polymethylenephenylisocyanate and the like, but preferably methylene diisocyanate type and toluylene diisocyante type compounds.

Further, according to the present invention, it is also crucial to form a desired layer such as magnetic layer by coating by incorporating a cyclic ether (particularly tetrahydrofuran or dioxane) in the paint containing the above urethane resin. That is, a cyclic ether such as tetrahydrofuran can dissolve well a urethane resin, whereby the viscosity of the paint can be adequately suppressed to enable sufficiently and easily dispersion of particles such as magnetic powder. In contrast, with the use of a solvent other than cyclic ether, the paint viscosity becomes so high that no good dispersion can be effected. The content of the cyclic ehter should desirably be 20 to 150 parts by weight (per 100 parts by weight of the magnetic powder). If the amount is either too small or too much, the physical properties of the coating tend to be deteriorated.

Further, the magnetic recording medium according to the present invention should desirably have a coercive force (Hc) of at least 500 Oe, whereby retentivity of the recorded information (accordingly residual flux density) becomes sufficient to give very good reproduction characteristic. However, if Hc is too great, extinction characteristic will contrariwise become worsened, and hence the upper limit of Hc should desirably be made 1600 Oe. For setting Hc at 500 Oe or higher, selection may be made particularly of the kind of the magnetic powder for the magnetic layer. As the magnetic powder, there may be included Co-containing-γ-$Fe_2O_3$, Fe type metallic magnetic powder.

Generally speaking, in the magnetic recording medium with a Hc less than 500 Oe, the strength and performance required can be obtained with the use of a conventional urethane resin, but no sufficient strength and performance can be obtained for a magnetic recording medium with a Hc of 500 Oe or higher, unless a hard urethane resin such as a urethane resin having cyclic hydrocarbon residues as described above is used. This is because of the difference in the device for which the magnetic recording medium is employed, namely because the device (e.g. video deck, etc.) for which the medium with 500 Oe or more is employed is harder in running system, particularly more severe in influence of the running system on the medium. The present invention can satisfactorily respond to such a demand.

As the above solvent, there may be included cyclic ethers such as tetrahydrofuran, dioxane, etc., and in addition to these, ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, ethylene glycol monoacetate and the like; ethers such as ethylene glycol dimethyl ether, diethylene glycol monoethyl ether and the like; aromatic hydrocarbons such as benzene, toluene, xylene and the like; halogenated hydrocarbons such as methylene chloride, ethylene chloride, carbon tetrachloride, chloroform, dichlorobenzene and the like; and so on.

Figure 7:
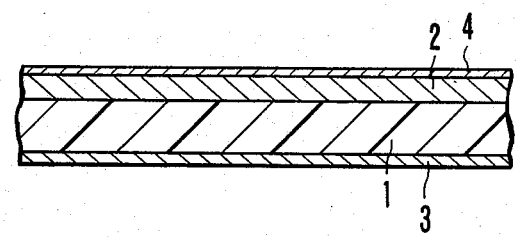
FIG. 7 and FIG. 8 are respective partial enlarged sectional views of magnetic recording media according to respective examples.

FIG. 7 shows another example of magnetic recording medium, in which an OC layer 4 is provided on the magnetic layer 2 of the medium as shown in FIG. 4.

The OC layer 4 is provided for the purpose of protecting the magnetic layer 2 against damages, etc. and for this purpose it is required to have sufficient lubricity.

Accordingly, as the binder resin for the OC layer 4, the urethane resin used for the above BC layer 3 (desirably in combination with a phenoxy resin and/or a vinyl chloride type copolymer) is employed. The surface roughness of the OC layer 4 should desirably be made in relationship with the color-S/N such that $Ra \leq 0.01$ μm and $Rmax \leq 0.13$ μm. In this case, it is desirable that the surface roughness of the support 1 used should be smooth with $Ra \leq 0.01$ and $Rmax \leq 0.13$ μm. The above urethane resin may also be contained in both of the OC layer 4 and the BC layer.

Figure 8:
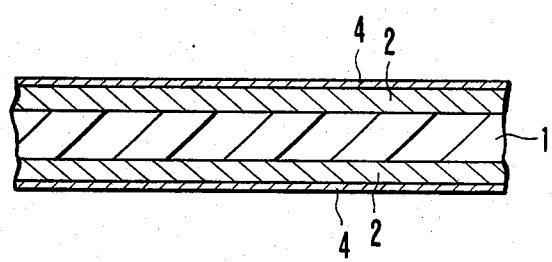

FIG. 8 shows a magnetic recording medium constituted as a magnetic disc, in which the same magnetic layer 2 and the OC layer 4 are provided, respectively, on both surfaces of the support 1, and the binder resin comprising the above urethane resin as the main component is incorporated in the OC layer 4.

The present invention is described in detail by referring to the following Examples. The components, proportions and procedures shown below can be changed or modified variously without departing from the spirit of the present invention. In the following Examples, "parts" mean all "parts by weight".

EXAMPLE 1

A magnetic paint having the following composition was prepared.

| | |
|---|---|
| Co-containing-γ-$Fe_2O_3$ | 100 parts |
| Polyurethane (Estane 5701 produced by Goodrich Co.) | 40 parts |
| Vinyl chloride-vinyl acetate copolymer (VAGH produced by U.C.C. Co.) | 40 parts |
| Lecithin | 2 parts |
| Myristic acid | 1 part |
| Butyl stearate | 1 part |
| Methyl ethyl ketone | 72 parts |
| Toluene | 50 parts |

-continued

| | |
|---|---|
| Cyclohexanone | 80 parts |
| Carbon black (Conductex 975 produced by Columbia carbon Co.) | 2 parts |

The composition was thoroughly mixed under stirring in a ball mill, further admixed with 10 parts of a polyfunctional isocyanate (Coronate L produced by Nippon Polyurethane Co.) and filtered through a filter with a mean pore size of 1 μm. The resultant magnetic paint was applied to a dried thickness of 5 μm on the surface of a polyetheyleneterephthalate base with a thickness of 12 μm.

On the other hand, a paint for backing having the composition shown below was also prepared.

| | |
|---|---|
| Urethane resin containing cyclohexyl groups (synthesized from 1,4-dihydroxy-methylcyclohexanone and adipic acid) | 10 parts |
| Vinyl chloride-vinyl acetate copolymer (VAGH produced by U.C.C. Co.) | 4 parts |
| Isocyanate (Coronate L produced by Nippon Polyurethane Co.) | 3 parts |
| Methyl ethyl ketone | 70 parts |
| Toluene | 30 parts |
| Cyclohexanone | 100 parts |
| Isocetyl stearate | 0.3 part |
| Carbon black (Conductex 975 produced by Columbia carbon Co.) | 9 parts |

This paint was applied to a dried thickness of 0.5 μm on the base surface on the side opposite to the above magnetic layer to form a BC layer.

Then, the magnetic layer was subjected to the surface working treatment by super calender rolls to obtain a broad magnetic film having a magnetic layer with a desired thickness. This film was cut to have a breadth of 12.7 mm for preparation of a magnetic tape for video recording.

EXAMPLE 2

In Example 1, Fe type metallic magnetic powder was employed as the magnetic powder and VAGH was replaced with a phenoxy resin (PKHH produced by U.C.C.), following otherwise the same procedure as in Example 1, to form a magnetic layer. On this magnetic layer, a paint for over coating comprising the paint composition for back-coating of Example 1 was applied to a thickness of 0.1 μm or less to form an over-coating layer (this is called Example 2).

COMPARATIVE EXAMPLE 1

In place of the urethane resin in the paint for back-coating in Example 1, a urethane resin having no cyclohexyl group in the molecule MAU 2010 (produced by Dainichi Seika Co.) was used to prepare a paint for back-coating, which was asppplied on the support surface similarly as in Example 1 to form a BC layer.

COMPARATIVE EXAMPLE 2

In place of the BC layer of Example 2, a tape provided with the BC layer of Comparative example 1 was prepared.

For each of the sample tapes in the respective examples as described above, the following tests were conducted to obtain the results shown in Table 1.

That is, by use of a commercially available VHS system VTR, each tape was run under the conditions of 20° C. and 65% RH for 50 times and thereafter subjected to the following measurements.

Contamination of guide pin:

Contamination attached on the guide pin which is in contact with the back surface of the tape is observed and evaluated as no contamination by the mark or presence of contamination by the mark X;

Drop out:

By use of a drop out counter produced by Victor Co. "MODEL VD-3D", the value when setting at −20 dB level down and 15 μs is measured;

Chroma-S/N:

Measured by means of a color video noise meter "Shibasoku 925 D/1" with the use of the tape of Comparative example 1 as the standard;

Jitter value:

By means of a VTR jitter meter produced by Meguro Electronics Co. "MK-612A", respective jitter values after running for 0 time and 100 times under high temperature and high humidity of 30° C. and 80% RH are measured.

The results are shown in Table 1.

TABLE 1

| | Example 1 | Example 2 | Comparative example 1 | Comparative example 2 |
|---|---|---|---|---|
| Contamination of guide pin | O | O | X | X |
| Drop out (15 μs): | | | | |
| 0 time | 0 | 0 | 0 | 0 |
| 100 times | 0 | 0 | 23 | 25 |
| Chroma-S/N (dB) | +2 | +4 | 0 | 0 |
| Jitter (μsec) | 0.09 | 0.11 | >4 | >4 |

From these results, it can be appreciated that the tape performance can be markedly improved by incorporating the urethane resin of the present invention in the BC layer.

EXAMPLES 3-4

The components as shown in Table 2 were charged and dispersed in a ball mill, followed by filtration of the magnetic paint by a 1 μm filter. Then, 5 parts of a polyfunctional isocyanate were added and each composition obtained was applied by a reverse roll coater to a thickness of 5 μm on a support. After super calendering, each tape was slitted to a width of ½ inch to obtain a video tape (corresponding to respective numbers of Examples and Comparative examples).

TABLE 2

| | Example 3 | Example 4 | Comparative example 3 | Comparative example 4 |
|---|---|---|---|---|
| Co-containing-γ-$Fe_2O_3$ | 100 | | 100 | |
| Fe type metallic magnetic powder | | 100 | | 100 |
| Polyurethane (having yield point) | 11 | 11 | | |
| Vinyl chloride-vinyl acetate copolymer (VAGH) | 11 | | 11 | |
| Phenoxy resin (PKHH) | | 11 | | 11 |
| Estane 5701 | | | 11 | 11 |
| Myristic acid | 0.5 | 0.5 | 0.5 | 0.5 |
| Palmitic acid | 0.5 | 0.5 | 0.5 | 0.5 |
| Butyl stearate | 1 | 1 | 1 | 1 |

TABLE 2-continued

|  | Example 3 | Example 4 | Comparative example 3 | Comparative example 4 |
|---|---|---|---|---|
| Lecithin | 3 | 3 | 3 | 3 |
| Alumina | 2 | 2 | 2 | 2 |
| Carbon black | 5 | 5 | 5 | 5 |
| Cyclohexanone | 160 | 160 | 160 | 160 |
| Tetrahydrofuran | 50 | 50 | 50 | 50 |
| Toluene | 70 | 70 | 70 | 70 |
| Mercapto-modified organic silicone compound | 0.01 | 0.01 | | |
| Organic silicone compound without mercapto modification | | | 0.01 | 0.01 |

In the above Table 2, the following compound was used as the mercapto-modified organic silicone compound:

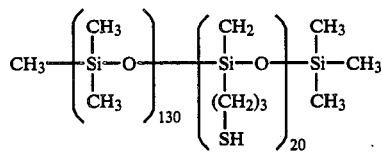

For the video tapes of the above respective examples, the following measurements were conducted:

RF output:

By means of a VTR deck for measurement of RF output, RF output at 4 MHz is measured, and the value lowered from the initial value after reproduction for 100 times is indicated;

Skew value:

This is the parameter representing the greatness of deviation of timing during image reproduction, and deviation from the standard signal (the signal scanning at about 64 $\mu$sec on CRT picture) after reproduction for 100 times is measured, its value being smaller as the deviation is smaller with less disturbance of image.

Also, the jitter values are measured similarly as in Examples 1 and 2.

The performances of the video tapes of respective examples are shown in Table 3.

TABLE 3

|  | Example 3 | Example 4 | Comparative example 3 | Comparative example 4 |
|---|---|---|---|---|
| RF output (dB) | 0 | 0 | −1.8 | −2.1 |
| Skew value ($\mu$sec) | 3.0 | 4.8 | 12.1 | 10.4 |
| Jitter value ($\mu$sec) | 0.112 | 0.108 | 0.122 | 0.119 |
| Audio output fluctuation after 100 passes | 0 | 0 | 8.4 | 4.5 |

In the above Table, RF output and audio output fluctuation after 100 passes of Comparative example 3 are measured relative to Example 3 as being 0 dB, and RF output and audio output fluctuation after 100 passes of Comparative example 4 relative to Example 4 as being 0 dB.

From the above results, it can be appreciated that the tape performances can be markedly improved in Examples having formed magnetic layers based on the present invention.

EXAMPLES 5-6

The components as shown in Table 4 were charged and dispersed in a ball mill, followed by filtration of the magnetic paint by a 1 $\mu$m filter. Then, 5 parts of a polyfunctional isocyanate were added and each composition obtained was applied by a reverse roll coater to a thickness of 5 $\mu$m on a support. After super calendering, each tape was slitted to a width of ½ inch to obtain a video tape (corresponding to respective numbers of Examples and Comparative examples).

TABLE 4

|  | Example 5 | Example 6 | Comparative example 5 | Comparative example 6 |
|---|---|---|---|---|
| Co-containing-$\gamma$-Fe$_2$O$_3$ | 100 | | 100 | |
| Fe type metallic magnetic powder | | 100 | | 100 |
| Polyurethane (having yield point) | 6 | 6 | | |
| Vinyl chloride-vinyl acetate copolymer (VAGH) | 11 | | 11 | |
| Phenoxy resin (PKHH) | | 11 | | 11 |
| Polyurethane (having no yield point) | 5 | 5 | 11 | 11 |
| Palmitic acid | 0.5 | 0.5 | 0.5 | 0.5 |
| Butyl stearate | 0.5 | 0.5 | 0.5 | 0.5 |
| Lecithin | 3 | 3 | 3 | 3 |
| Alumina | 2 | 2 | 2 | 2 |
| Carbon black | 5 | 5 | 5 | 5 |
| Cyclohexanone | 160 | 160 | 160 | 160 |
| Tetrahydrofuran | 50 | 50 | 50 | 50 |
| Toluene | 70 | 70 | 70 | 70 |

For the video tapes of the above respective examples, the measurements were conducted similarly as in Examples 3-4.

The performances of the video tapes of respective examples are shown in Table 5.

TABLE 5

|  | Example 5 | Example 6 | Comparative example 5 | Comparative example 6 |
|---|---|---|---|---|
| RF output (dB) | 0 | 0 | −1.5 | −1.6 |
| Skew value ($\mu$sec) | 4.8 | 5.0 | 11.3 | 8.9 |
| Jitter value ($\mu$sec) | 0.105 | 0.108 | 0.120 | 0.117 |

In the above Table, RF output of Comparative example 5 is measured relative to Example 5 as being 0 dB, and RF output of Comparative example 6 relative to Example 6 as being 0 dB.

From the above results, it can be appreciated that the tape performances can be markedly improved by incorporating both urethane resins in magnetic layers based on the present invention.

EXAMPLES 7-8

The components as shown in Table 6 were charged and dispersed in a ball mill, followed by filtration of the magnetic paint by a 1 $\mu$m filter. Then, a polyfunctional isocyanate in Table 6 were added and each composition obtained was applied by a reverse roll coater to a thickness of 5 μm on a support. After super calendering, each tape was slitted to a width of ½ inch to obtain a video tape (corresponding to respective numbers of Examples and Comparative examples).

TABLE 6

|  | Example 7 | Example 8 | Comparative example 7 | Comparative example 8 |
|---|---|---|---|---|
| Co-containing-γ-Fe₂O₃ | 100 |  | 100 |  |
| Fe type metallic magnetic powder |  | 100 |  | 100 |
| Polyurethane (having yield point) | 6 | 6 |  |  |
| Vinyl chloride-vinyl acetate copolymer (VAGH) | 11 |  | 11 |  |
| Phenoxy resin (PKHH) |  | 11 |  | 11 |
| Estane 5701 |  |  | 11 | 11 |
| Myristic acid | 0.5 | 0.5 | 0.5 | 0.5 |
| Butyl stearate | 0.5 | 0.5 | 0.5 | 0.5 |
| Lecithin | 3 | 3 | 3 | 3 |
| Alumina | 2 | 2 | 2 | 2 |
| Carbon black | 5 | 5 | 5 | 5 |
| Cyclohexanone | 160 | 160 | 160 | 160 |
| Tetrahydrofuran | 50 | 50 | 50 | 50 |
| Toluene | 70 | 70 | 70 | 70 |
| Aromatic isocyanate (Coronate L) | 2.5 | 2.5 | 2.5 | 2.5 |
| Aliphatic isocyanate (IPDI) | 2.5 | 2.5 | 2.5 | 2.5 |

For the video tapes of the above respective examples, the measurements were conducted similarly as in Examples 3–4.

The performances of the video tapes of respective examples are shown in Table 7.

TABLE 7

|  | Example 7 | Example 8 | Comparative example 7 | Comparative example 8 |
|---|---|---|---|---|
| RF output (dB) | 0 | 0 | −1.7 | −1.9 |
| Skew value (μsec) | 3.8 | 4.5 | 20.3 | 18.5 |
| Jitter value (μsec) | 0.107 | 0.110 | 0.120 | 0.118 |
| Audio output fluctuation after 100 passes (dB) | 0 | 0 | 4.5 | 4.0 |

In the above Table, RF output and audio output fluctuation after 100 passes of Comparative example 7 are measured relative to Example 7 as being 0 dB, and RF output and audio output fluctuation after 100 passes of Comparative example 8 relative to Example 8 as being 0 dB.

From the above results, it can be appreciated that the tape performances can be markedly improved in Examples having formed magnetic layers based on the present invention.

EXAMPLES 9–10

The components as shown in Table 8 were charged and dispersed in a ball mill, followed by filtration of the magnetic paint by a 1 μm filter. Then, a polyfunctional isocyanate in Table 8 were added and each composition obtained was applied by a reverse roll coater to a thickness of 5 μm on a support. After super calendering each tape was slitted to a width of ½ inch to obtain a video tape (corresponding to respective numbers of Examples and Comparative examples).

TABLE 8

|  | Example 9 | Example 10 | Comparative example 9 | Comparative example 10 |
|---|---|---|---|---|
| Co-containing-γ-Fe₂O₃ | 100 |  | 100 |  |
| Fe type metallic magnetic powder |  | 100 |  | 100 |
| Polyurethane (having yield point) | 11 | 11 |  |  |
| Vinyl chloride-vinyl acetate copolymer (VAGH) | 11 |  | 11 |  |
| Phenoxy resin (PKHH) |  | 11 |  | 11 |
| Estane 5701 |  |  | 11 | 11 |
| Myristic acid | 0.5 | 0.5 | 0.5 | 0.5 |
| Butyl stearate | 0.5 | 0.5 | 0.5 | 0.5 |
| Lecithin | 3 | 3 | 3 | 3 |
| Alumina | 2 | 2 | 2 | 2 |
| Carbon black | 5 | 5 | 5 | 5 |
| Cyclohexanone | 160 | 160 | 160 | 160 |
| Tetrahydrofuran | 50 | 50 | 50 | 50 |
| Toluene | 70 | 70 | 70 | 70 |
| Aromatic isocyanate (Coronate L) | 5.5 | 5.5 | 1.5 | 1.5 |
| Aliphatic isocyanate (IPDI) | 5.5 | 5.5 | 1.5 | 1.5 |

For the video tapes of the above respective examples, the measurements were conducted similarly as in Examples 3–4.

The performances of the video tapes of respective examples are shown in Table 9.

TABLE 9

|  | Example 9 | Example 10 | Comparative example 9 | Comparative example 10 |
|---|---|---|---|---|
| RF output (dB) | 0 | 0 | −2.0 | −2.3 |
| Skew value (μsec) | 3.6 | 3.3 | 15.7 | 18.2 |
| Jitter value (μsec) | 0.111 | 0.113 | 0.127 | 0.119 |
| Audio output fluctuation after 100 passes (dB) | 0 | 0 | 3.8 | 4.0 |

In the above Table, RF output and audio output fluctuation after 100 passes of Comparative example 7 are measured relative to Example 7 as being 0 dB, and RF output and audio output fluctuation after 100 passes of Comparative example 8 relative to Example 8 as being 0 dB.

From the above results, it can be appreciated that the tape performances can be markedly improved in Examples having formed magnetic layers based on the present invention.

EXAMPLES 11–12

The components as shown in Table 10 were charged and dispersed in a ball mill, followed by filtration of the magnetic paint by a 1 μm filter. Then, 5 parts of a polyfunctional isocyanate were added and each composition obtained was applied by a reverse roll coater to a thickness of 5 μm on a support. After super calendering, each tape was slitted to a width of ½ inch to obtain a video tape (corresponding to respective numbers of Examples and Comparative examples).

TABLE 10

|  | Example 11 | Example 12 | Comparative example 11 | Comparative example 12 |
|---|---|---|---|---|
| Co-containing-$\gamma$-$Fe_2O_3$ (5 atomic % of $Fe^{2+}$) | 100 | 100 | | |
| Co-containing-$\gamma$-$Fe_2O_3$ (3 atomic % of $Fe^{2+}$) | | | 100 | 100 |
| Polyurethane (having yield point) | 11 | 11 | | |
| Vinyl chloride-vinyl acetate copolymer (VAGH) | 11 | | 11 | |
| Phenoxy resin (PKHH) | | 11 | | 11 |
| Estane 5701 | | | 11 | 11 |
| Myristic acid | 0.5 | 0.5 | 0.5 | 0.5 |
| Palmitic acid | 0.5 | 0.5 | 0.5 | 0.5 |
| Butyl stearate | 1 | 1 | 1 | 1 |
| Lecithin | 3 | 3 | 3 | 3 |
| Alumina | 2 | 2 | 2 | 2 |
| Carbon black | 5 | 5 | 5 | 5 |
| Cyclohexanone | 160 | 160 | 160 | 160 |
| Tetrahydrofuran | 50 | 50 | 50 | 50 |
| Toluene | 70 | 70 | 70 | 70 |

For the video tapes of the above respective examples, the measurements were conducted as follows:

Chroma-S/N:
measured by means of a color video noise meter "Shibasoku 925 D/1";

Lumi-S/N:
the same as above.

The performances of the video tapes of respective examples are shown in Table 11.

TABLE 11

|  | Example 11 | Example 12 | Comparative example 11 | Comparative example 12 |
|---|---|---|---|---|
| Chroma-S/N (dB) | 0 | 0 | −1.6 | −1.5 |
| Lumi-S/N (dB) | 0 | 0 | −0.8 | −1.2 |
| RF output (dB) | 0 | 0 | −1.1 | −1.3 |
| Light transmittance (%) | 0.01 | 0.01 | 0.06 | 0.06 |

In the above Table, Chroma-S/N, Lumi-S/N and RF output of Comparative example 11 are measured relative to Example 11 as being 0 dB, and Chroma-S/N, Lumi-S/N and RF output of Comparative example 12 are measured relative to Example 12 as being 0 dB.

From the above results, it can be appreciated that the tape performances can be markedly improved in Examples having formed magnetic layers based on the present invention.

EXAMPLES 13–15

The components as shown in Table 12 were charged and dispersed in a ball mill, followed by filtration of the magnetic paint by a 1 μm filter. Then, 5 parts of a polyfunctional isocyanate were added and each composition obtained was applied by a reverse roll coater to a thickness of 5 μm on a support. After super calendering, each tape was slitted to a width of ½ inch to obtain a video tape (corresponding to respective numbers of Examples and Comparative examples).

TABLE 12

|  | Example 13 | Example 14 | Example 15 | Comparative example 13 | Comparative example 14 |
|---|---|---|---|---|---|
| Co-containing-$\gamma$-$Fe_2O_3$ (BET value 32 m²/g) | 100 | | 100 | 100 | |
| Fe type metallic magnetic powder (BET value 45 m²/g) | | 100 | | | 100 |
| Polyurethane (having yield point) | 11 | 11 | 12 | | |
| Vinyl chloride-vinyl acetate copolymer (VAGH) | 11 | | 6 | 11 | |
| Phenoxy resin (PKHH) | | 11 | | | 11 |
| Nitrocellulose | | | 4 | | |
| Estane 5701 | | | | 11 | 11 |
| Myristic acid | 0.5 | 0.5 | 0.5 | 0.5 | 0.5 |
| Butyl stearate | 0.5 | 0.5 | 0.5 | 0.5 | 0.5 |
| Lecithin | 3 | 3 | 3 | 3 | 3 |
| Alumina | 2 | 2 | 2 | 2 | 2 |
| Carbon black | 5 | 5 | 5 | 5 | 5 |
| Cyclohexanone | 160 | 160 | 160 | 160 | 160 |
| Tetrahydrofuran | 50 | 50 | 50 | 50 | 50 |
| Toluene | 70 | 70 | 70 | 70 | 70 |

For the video tapes of the above respective examples, the measurements were conducted similarly as in Examples 3 and 4.

The performances of the video tapes of respective examples are shown in Table 13.

TABLE 13

|  | Example 13 | Example 14 | Example 15 | Comparative example 13 | Comparative example 14 |
|---|---|---|---|---|---|
| RF output (dB) | 0 | 0 | −0.2 | −1.3 | −1.8 |
| Skew value (μsec) | 3.8 | 4.5 | 3.0 | 13.3 | 11.9 |
| Jitter value (μsec) | 0.112 | 0.109 | 0.107 | 0.122 | 0.127 |
| Audio output fluctuation after 100 passes (dB) | 0 | 0 | −1.5 | 9.4 | 12.1 |

In the above Table, RF output and audio output fluctuation after 100 passes of Comparative example 13 are measured relative to Example 13 as being 0 dB, RF output and audio output fluctuation after 100 passes of Comparative example 14 are measured relative to Example 14 as being 0 dB, and RF output and audio output fluctuation after 100 passes of Example 15 are measured relative to Example 13 as being 0 dB.

From the above results, it can be appreciated that the tape performances can be markedly improved in Examples having formed magnetic layers based on the present invention.

EXAMPLES 16–17

The components as shown in Table 14 were charged and dispersed in a ball mill, followed by filtration of the magnetic paint by a 1 μm filter. Then, 5 parts of a polyfunctional isocyanate were added and each composition obtained was applied by a reverse roll coater to a thickness of 5 μm on a support. After super calendering, each tape was slitted to a width of ½ inch to obtain a video tape (corresponding to respective numbers of Examples and Comparative examples).

TABLE 14

|  | Example 16 | Example 17 | Comparative example 15 | Comparative example 16 |
|---|---|---|---|---|
| Co-containing γ-Fe$_2$O$_3$ | 100 |  | 100 |  |
| Fe type metallic magnetic powder |  | 100 |  | 100 |
| Polyurethane (having yield point) | 11 | 11 |  |  |
| Vinyl chloride-vinyl acetate copolymer (VAGH) | 11 |  | 11 |  |
| Phenoxy resin (PKHH) |  | 11 |  | 11 |
| Estane 5701 |  |  | 11 | 11 |
| Myristic acid | 0.5 | 0.5 | 0.5 | 0.5 |
| Butyl stearate | 0.5 | 0.5 | 0.5 | 0.5 |
| Lecithin | 3 | 3 | 3 | 3 |
| Alumina (mean particle size: 3.6 μm) | 2 | 2 |  |  |
| Alumina (mean particle size: 4.3 μm) |  |  | 2 | 2 |
| Carbon black | 5 | 5 | 5 | 5 |
| Cyclohexanone | 160 | 160 | 160 | 160 |
| Tetrahydrofuran | 50 | 50 | 50 | 50 |
| Toluene | 70 | 70 | 70 | 70 |

For the video tapes of the above respective examples, the measurements were conducted similarly as in Examples 3 and 4.

Head wear is measured according to the following method:

Head wear:

Value representing the reduction in head thickness after reproduction for 100 hours (value relative to Example 16 as the standard).

The performances of the video tapes of respective examples are shown in Table 15.

TABLE 15

|  | Example 16 | Example 17 | Comparative example 15 | Comparative example 16 |
|---|---|---|---|---|
| RF output (dB) | 0 | 0 | 1.9 | 1.8 |
| Skew value (μsec) | 4.8 | 2.50 | 14.0 | 12.4 |
| Jitter value (μsec) | 0.108 | 0.108 | 0.121 | 0.123 |
| Audio output fluctuation after 100 passes (dB) | 0 | 0 | 0.5 | 4 |
| Head wear (μm) | 0 | 0.5 | 5 | 4 |

In the above Table, RF output and audio output fluctuation after 100 passes of Comparative example 15 is measured relative to Example 16 as being 0 dB, and RF output and audio output fluctuation after 100 passes of Comparative example 16 are measured relative to Example 17 as being 0 dB.

From the above results, it can be appreciated that the tape performances can be markedly improved in Examples having formed magnetic layers based on the present invention.

We claim:

1. A magnetic recording medium comprising a support magnetic recording layer and optionally a back-coating layer, at least one of said magnetic recording layer and said optional back-coating layer containing a urethane resin having a yield point.

2. A magnetic recording medium of claim 1, wherein said yield point exist in the stress range of from 50 kg/m$^2$ to 600 kg/m$^2$.

3. A magnetic recording medium of claim 1, wherein said magnetic recording layer contains said urethane resin having a yield point.

4. A magnetic recording medium of claim 3, wherein said magnetic recording layer further contains at least one of an aromatic isocyanate and an aliphatic isocyanate.

5. A magnetic recording medium of claim 3, wherein said magnetic recording layer further contains an urethane resin having no yield point.

6. A magnetic recording medium of claim 3, wherein said magnetic recording layer contains a mercapto-modified organic silicon compound represented by the formula:

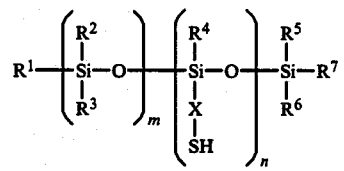

wherein R$^1$, R$^2$, R$^3$, R$^4$, R$^5$, R$^6$ and R$^7$ represent hydrocarbon residues which are identical or different, X represents a hydrocarbon residue having 1 to 30 carbon atoms, m is 0≦m<1000, n is 1≦n<300 and m+n is m+n≦1000.

7. A magnetic recording medium of claim 4, wherein an amount of said isocyanates is in the range of from 5 to 40% by weight based on a binder resin.

8. A magnetic recording medium of claim 3, wherein said magnetic recording layer contains abrasives having an average particle size of 0.4 μm or less.

9. A magnetic recording medium of claim 3, wherein said magnetic recording layer contains iron oxide magnetic particles containing 4 to 6 atomic % of divalent iron.

10. A magnetic recording medium of claim 3, wherein said magnetic recording layer contains a magnetic particle having specific surface area in terms of BET value of 30 m$^2$/g or higher.

11. A magnetic recording medium of claim 3, wherein said magnetic recording layer contains at least one of a vinyl chloride copolymer and a phenoxy resin.

12. A magnetic recording medium of claim 1, wherein said back-coating layer contains said urethane resin having a yield point.

13. A magnetic recording medium of claim 12, wherein said back-coating layer further contains at least one of an aromatic isocyanate and an aliphatic isocyanate.

14. A magnetic recording medium of claim 12, wherein said back-coating layer further contains an urethane resin having no yield point.

15. A magnetic recording medium of claim 12, wherein said back-coating layer contains a mercapto-modified organic silicon compound represented by the formula:

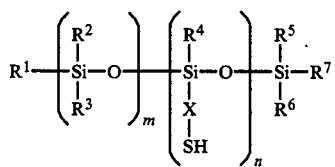

wherein $R^1$, $R_2$, $R^3$, $R^4$, $R^5$, $R^6$ and $R^7$ represent hydrocarbon residues which are identical or different, X represents a hydrocarbon residue having 1 to 30 carbon atoms, m is $0 \leq m < 1000$, n is $1 \leq n < 300$ and m+n is $m+n \leq 1000$.

16. A magnetic recording medium of claim 13, wherein an amount of said isocyanates is in the range of from 5 to 40% by weight based on a binder resin.

17. A magnetic recording medium of claim 12, wherein said back-coating layer contains at least one of a vinyl chloride copolymer and a phenoxy resin.

18. A magnetic recording medium of claim 1, wherein said urethane resin has a saturated cyclic hydrocarbon residue.

* * * * *

UNITED STATES PATENT AND TRADEMARK OFFICE
CERTIFICATE OF CORRECTION

PATENT NO. : 4,652,496

DATED : March 24, 1987

INVENTOR(S) : Yoshitaka Yasufuku et al

It is certified that error appears in the above-identified patent and that said Letters Patent is hereby corrected as shown below:

In the ABSTRACT, line 3, after "least" insert --one--.

Column 4, line 10, after "least" insert --one--.

Column 25, line 26, left column of TABLE 14, replace "3.6" with --0.36--.

Column 25, line 28, left column of TABLE 14, replace "4.3" with --0.43--.

Column 26, line 8, replace "$kg/m^2$", both occurrences, with --$kg/cm^2$--.

Signed and Sealed this

Twenty-second Day of November, 1988

Attest:

DONALD J. QUIGG

*Attesting Officer*  *Commissioner of Patents and Trademarks*